United States Patent

[11] 3,629,055

[72] Inventors Roland Hendrik Riem
 Oakville, Ontario;
 Wilhelmus Theodorus Albertus Dwars,
 Clarkson, Ontario, both of Canada
[21] Appl. No. 791,768
[22] Filed Jan. 16, 1969
[45] Patented Dec. 21, 1971
[73] Assignee Abitibi Paper Company Ltd.
 Toronto, Ontario, Canada
[32] Priority Nov. 15, 1968
[33] Canada
[31] 035,278

[54] PROCESS FOR MAKING FIRE RETARDANT HARDBOARD CONTAINING AMMONIUM BORATE
 6 Claims, No Drawings

[52] U.S. Cl. .................................................. 162/159,
 106/15, 117/138, 162/181 A, 252/8.1
[51] Int. Cl. ......................................................... D21d 3/00
[50] Field of Search ........................................... 162/159,
 181, 181 A; 117/138; 106/15; 252/8.1

[56] References Cited
 UNITED STATES PATENTS

| | | | |
|---|---|---|---|
| 1,813,367 | 7/1931 | Thompson .................... | 252/8.1 |
| 1,839,136 | 12/1931 | Somoza ....................... | 162/159 |
| 1,924,181 | 8/1933 | Cutler ......................... | 162/159 |
| 2,030,653 | 2/1936 | Quinn .......................... | 162/159 |
| 2,884,343 | 4/1959 | McCluer ...................... | 106/15 |
| 3,245,870 | 4/1966 | Orth ............................ | 162/159 |

*Primary Examiner*—S. Leon Bashore
*Assistant Examiner*—Richard H. Anderson
*Attorney*—Stevens, Davis, Miller & Mosher ABSTRACT: A fire retardant hardboard is produced by adding a watersoluble hydrolyzable ammonium borate composition, in a quantity which will provide 1.3 percent to 7.0 percent by weight of boron in the hardboard, to a partially dewatered mat or to a fibrous slurry where the mole ratio of ammonium to borate expressed as the ratio of ammonium hydroxide to boric acid is from 0.3 to 1 to 0.4 to 1 and subsequently applying heat and pressure to form the hardboard.

PROCESS FOR MAKING FIRE RETARDANT HARDBOARD CONTAINING AMMONIUM BORATE

This invention relates to a method for making fire-retardant hardboard.

Various methods of improving the fire-retardant properties of cellulosic and ligno-cellulosic products are described in the art. One method commonly used is the addition to these products of fire-retarding chemicals. Many chemicals and their combinations have been described, including such boron compounds as borax and boric acid. More particularly, the use of ammonium borate and boric acid has been disclosed in U.S. Pat. No. 3,245,870 dated Apr. 12, 1966 and corresponding Canadian Pat. No. 786,755.

In some instances the boron compound has been added in the form of an essentially water-insoluble, nonhydrolyzing borate. In other instances the recommended procedure has involved the addition of a solution of a water-soluble borate.

Use of a water-insoluble borate has presented difficulties in application and in incorporating in the hardboard sufficient boron to give the desired fire retardancy. Further, though the exact mechanism through which boron compounds impart fire retardancy to the hardboard is uncertain, there is evidence that it is related to the extend of chemical reaction of the boron compounds with the wood fibers and, for this reason, a water-soluble compound is to be preferred, in order to facilitate such a reaction. However, problems are encountered when attempts are made to use water-soluble borates to treat hardboard.

Sodium is unsatisfactory as a base when treating hardboard as it leads to sticking problems in the hot pressing stage of manufacture. Furthermore it has inferior afterglow suppression properties. In an experiment using borax and boric acid, it led to spotting and discoloration in the press.

The formulation of ammonium borate and boric acid corresponding to ammonium pentaborate disclosed in U.S. Pat. No. 3,245,870 and Canadian Pat. No. 786,755 is unsuitable for hardboard as it results in a board with a scorched or discolored surface. The mole ratio taught by such patents when expressed in terms of ammonium hydroxide to boric acid is 0.2 to 1.

The object of this invention is to provide a method of imparting fire retardancy to hardboard using a water-soluble borate composition which results in a board with an unscorched and undiscolored surface.

Another object of the present invention is the provision of a fire-retarding hardboard that does not produce excessive smoke on combustion. Another object is to provide a method of imparting fire retardancy which will not lead to problems of sticking in the hot press.

It has been found that a fire-retardant hardboard of satisfactory surface quality can be produced, using conventional hardboard manufacturing methods, by adding to the wood fibers a water-soluble hydrolyzable ammonium borate composition containing boric acid in quantities less than that found in ammonium pentaborate. No advantage is obtained and there is a cost detriment in a mole ratio of above 0.4 to 1 ammonium to borate groups. More particularly, therefore, the class of compositions used in effecting our invention are those where the ammonium to borate groups when expressed as the ratio of ammonium hydroxide to boric acid are present in the range of mole ratios of 0.3 to 1 to 0.4 to 1.

It is a known fact that boric acid when dissolved in water is not present as $H_3BO_3$, or as some simple monoboron ion, but that entities containing more than one boron atom are formed. All of the mono- and polyboron entities in the system are in chemical equilibrium. Thus it is possible to achieve a given solution composition by dissolving numerous different mixtures of boric acid and polyboron compounds. For example, we have found that an aqueous solution compounded from ammonium hydroxide and boric acid is equivalent for purposes of this invention to one compounded from boric acid and diammonium tetraborate [$(NH_4)_2B_4O_7$]. Aqueous systems compounded from ammonia and boric acid or ammonia and boric oxide ($B_2O_3$) are also equivalent. Thus it is to be understood that reference to an ammonium-borate composition indicates compositions of the type capable of being prepared from ammonium hydroxide and boric acid, whether or not the boron is present as a mono- or polyboron radical.

The reason for the effectiveness of the ammonium-borate compositions having the mole ratio required by this invention is not fully known and we do not wish to be limited to the theory expressed below. However, it is postulated that formation of the reaction products which give fire retardancy require acidic boron containing reactants and fiber. We believe that hydrolysis of the salt to produce the weak base and partial volatilization of ammonia results in the formation of the acidic boron containing reactants so that desired reaction products are produced and undesirable side effects are avoided.

In a conventional method of hardboard preparation, a wood fiber slurry is dewatered by filtration to form a mat, pressed to approximately 25–50 percent solids content, then subjected to a hot press cycle to form the hardboard and remove remaining moisture.

A desirable feature of this invention is that, using such conventional methods of manufacture, a number of different methods of introducing the fire-retardant composition to the product may be used. Application of the solution of appropriate composition to the cold pressed partially dewatered mat, or formation of a mat from a fiber slurry containing the fire-retardant borate in solution may be utilized. It is also possible to apply the boron compound as a powder to the surface of a wet-pressed mat followed by pouring an ammonia solution of appropriate strength over the whole mat. Alternatively the mat, at appropriate moisture content, and containing the boron compounds, can be exposed to gaseous ammonia.

The preferred form of the invention is the application of a solution containing or equivalent to ammonium hydroxide and boric acid in the mole ratio of 0.3 to 1 to 0.4 to 1, and preferably 0.3 to 1, to the wet mat after the initial pressing.

Where one of the methods of application involves retention materially less than 100 percent of the added boron, the unused boron can be recovered by passing the effluent through an appropriate ion exchange column. The effluent can be pretreated, as by dilution or clarification if desired, before passage through the ion exchange column.

The invention will be further illustrated by the examples listed in table I. The data shown were obtained using solutions prepared in various manners and containing borate and ammonium groups in varying mole ratios, and using various

TABLE I

| Sample | Flame-spread, in./min. | Flame-spread rating | Weight percent B in board | Mole ratio $NH_4OH$/$H_3BO_3$ | Remarks |
|---|---|---|---|---|---|
| 1 | | 212 | 0 | | Control. |
| 2 a | 8.0 | 112 | 0.499 | 0.29 | |
| 3 | 4.0 | 97 | 1.056 | 0.29 | Treating solution |
| 4 | 3.95 | 92 | 1.074 | 0.29 | compounded |
| 5 | 2.98 | 89 | 1.185 | 0.29 | from $H_3BO_3$ |
| 6 | 3.0 | 83 | 1.252 | 0.29 | and $(NH_4)_2$ |
| 7 | 3.2 | 86 | 1.263 | 0.29 | $B_4O_7.4H_2O$ |
| 8 | 2.0 | 63 | 1.410 | 0.29 | |
| 9 | | 85 | 1.067 | 0.25 | |
| 10 | 2.6 | 65 | 1.30 | 0.28 | |
| 11 | | 60 | 1.470 | 0.30 | |
| 12 | | 52 | 1.786 | 0.30 | |
| 13 | | 59 | 2.045 | 0.30 | |
| 14 | | 87 | 1.269 | 0.60 | |
| 15 | | 52 | 1.59 | 0.60 | |
| 16 | 2.1 | 57 | 1.35 | 0.57 | Treating solution |
| 17 | 5.53 | 105 | 0.759 | 2.12 | compounded |
| 18 | 3.49 | 84 | 1.192 | 2.12 | from $NH_4OH$ |
| 19 | 2.90 | 82 | 1.275 | 2.12 | and $H_3BO_3$ |
| 20 b | | 52 | 2.051 | 3.0 | |
| 21 | 4.2 | 96 | 0.760 | 4.26 | |
| 22 | 4.5 | 97 | 0.914 | 4.26 | |
| 23 | | 107 | 0.573 | 6.38 | |
| 24 | 6.54 | 107 | 0.654 | 6.38 | |
| 25 | 5.2 | 98 | 0.731 | 6.38 | |
| 26 | | | | 0.09 | Board charred in pressing. | a Wet mat formed from solution containing the chemicals.
b Slurry of $H_3BO_3$ in aqueous ammonia applied to wet pressed mat, additional aqueous ammonia distributed over the mat.

methods of application of the borate to the hardboard. The hardboard used was hardboard of specific gravity of about 0.95 and of a nominal thickness of one-fourth inch.

Except where noted the wet mat was formed in the conventional manner, and pressed to 400 p.s.i. to achieve 50 percent solids content. The treatment solution was then evenly distributed over the mat surface. The treated mat was then subjected to the conventional hot press cycle, at 350° F. and a maximum pressure of 400 p.s.i. Some experiments were performed where the wet mat after treatment, was subjected to further cold pressing prior to hot pressing. No significant difference was noted.

The accepted testing procedure for flammability of materials in North America is the so-called 25 foot tunnel test (ASTM designation E84). The test results referred to in table I were obtained in a 2-foot tunnel which had been calibrated with respect to the 25-foot tunnel.

Analysis of the data in Table I shows that, within the range of experimental error, equivalent flamespread ratings can be achieved using any of the starting materials described to form the fire-retardant composition and applying the composition in any of the described methods.

ASTM E84 tests carried out to determine smoke production on combustion of the treated product, show that the smoke production is less than the smoke produced in combusting red oak. Red oak is by definition given a smoke rating of 100 in the accepted ASTM E84 test procedure. For example with a mole ratio of 0.3 and 1.7 percent by weight boron retained in the hardboard a smoke rating of 35 was obtained together with a flamespread of 62. The hardboard was similar to that used in connection with table I.

The data in table I indicate that there is a linear relationship between the rate of flamespread and the boron content of the hardboard. However, we have found by infrared analysis of the treated hardboard that reaction products are formed between the acidic boron containing reactants and the wood fibers. Thus it is probable that fire retardancy is not directly related to the boron content in itself, but to the extent to which reaction products are formed between the acidic boron-containing reactants and the wood fiber constituents.

As the minimum standard for fire retardancy is for many purposes a flamespread rating of 75 or less, the percent of boron by weight in the hardboard should generally be in excess of 1.3 percent. For many purposes it is unnecessary to provide a percentage of boron by weight in excess of about 2 percent. However ratings as low as 25 are sometimes specified and boron as high as 6–7 percent by weight may be required. The preferred percentage by weight of boron is therefore from 1.3 to 7 percent.

The reason for specifying a mole ratio range of ammonium hydroxide to boric acid lies both in control of the reactions which occur and also in elimination of scorching of the hardboard surface. It has been found, for example, that a hardboard produced after treatment with an ammonium hydroxide-boric acid solution in the mole ratio 0.09 was scorched and of useless appearance. The same conditions of scorching or discoloration were noted for hardboard produced after treatment with solutions containing ammonium hydroxide and boric acid in the mole ratio of 0.18.

We claim:

1. A process of producing a fire-retardant hardboard comprising the application to the wood fibers of a composition of a watersoluble hydrolyzable ammonium-borate composition, wherein the mole ratio in said composition of the ammonium portion to the borate portion, when expressed as the ratio of ammonium hydroxide to boric acid, is from 0.3 to 1 to 0.4 to 1 and subsequently applying heat and pressure to form hardboard, said composition being applied in a quantity which will provide 1.3 to 7.0 percent by weight of boron in the treated hardboard.

2. A process as in claim 1 in which said ammonium borate composition is applied to a partially dewatered fiber mat.

3. A process as in claim 2 in which said composition is prepared by dissolving in water, ammonium hydroxide and boric acid.

4. A process as defined in claim 1 in which the mole ratio of ammonium hydroxide to boric acid is 0.3 to 1.

5. A process as defined in claim 1 in which the composition is prepared by the addition of diammonium tetraborate [$(NH_4)_2B_4O_7 \cdot 4H_2O$] and boric acid to water.

6. A process as defined in claim 1 in which the composition is added to the wood fiber slurry before mat formation.

* * * * *